United States Patent
Walsh et al.

(10) Patent No.: US 10,794,826 B2
(45) Date of Patent: Oct. 6, 2020

(54) TECHNIQUES AND MATERIALS FOR CALIBRATING OPTICAL SENSORS

(71) Applicant: Ecolab USA Inc., Saint Paul, MN (US)

(72) Inventors: Richard Joseph Walsh, Woodbury, MN (US); Evan Hendrickson, Saint Louis Park, MN (US); Caleb Power, Saint Paul, MN (US); Rodney Banks, Loda, IL (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 15/927,335

(22) Filed: Mar. 21, 2018

(65) Prior Publication Data
US 2018/0275052 A1    Sep. 27, 2018

Related U.S. Application Data

(60) Provisional application No. 62/477,287, filed on Mar. 27, 2017.

(51) Int. Cl.
*G01N 21/47* (2006.01)
*G01N 21/53* (2006.01)
(Continued)

(52) U.S. Cl.
CPC ...... *G01N 21/4785* (2013.01); *A47L 15/4297* (2013.01); *G01N 21/274* (2013.01);
(Continued)

(58) Field of Classification Search
CPC .... G01N 21/274; G01N 21/278; G01N 21/47; G01N 21/4738; G01N 21/4785;
(Continued)

(56) References Cited

U.S. PATENT DOCUMENTS

| 4,050,450 A | 9/1977 | Polanyi et al. |
| 5,125,747 A * | 6/1992 | Sayegh ............... G01N 21/274 356/243.1 |

(Continued)

FOREIGN PATENT DOCUMENTS

| CN | 105571914 A * | 5/2016 |
| EP | 2846150 A1 | 3/2015 |

(Continued)

OTHER PUBLICATIONS

"Formazine," Wikipedia, Retrieved online from <https://en.wikipedia.org/wiki/Formazine>, dated Oct. 30, 2016, 1 page.

(Continued)

*Primary Examiner* — Gordon J Stock, Jr.
(74) *Attorney, Agent, or Firm* — Fredrikson & Byron, P.A.

(57) ABSTRACT

A calibration material may be used to calibrate an optical sensor to help ensure that the optical sensor produces accurate measurements. In some examples, the calibration material may be used to calibrate both turbidity measurements made by an optical sensor and fluorometric measurements made by the same optical sensor. The calibration material may be an aqueous mixture that includes water in an amount greater than 70 percent by weight of the composition, inorganic, water-insoluble, light-scattering particles, and a viscosity modifier in an amount effective to maintain the inorganic, water-insoluble, light-scattering particles in suspension in the composition. The composition can be non-fluorescing when exposed to ultraviolet light. In addition, in some applications, the composition is formulated of food safe ingredients, allowing the composition to be used in facilities that process consumable foods and beverages.

13 Claims, 2 Drawing Sheets

(51) Int. Cl.
    *G01N 21/85*     (2006.01)
    *G01N 21/64*     (2006.01)
    *G01N 21/27*     (2006.01)
    *A47L 15/42*     (2006.01)

(52) U.S. Cl.
    CPC ........... *G01N 21/278* (2013.01); *G01N 21/53* (2013.01); *G01N 21/534* (2013.01); *G01N 21/645* (2013.01); *G01N 21/85* (2013.01); *G01N 21/8507* (2013.01); *G01N 2021/4766* (2013.01); *G01N 2021/6491* (2013.01)

(58) Field of Classification Search
    CPC ...... G01N 21/49; G01N 21/53; G01N 21/534; G01N 21/62; G01N 21/63; G01N 21/64; G01N 21/6428; G01N 21/645; G01N 21/85; G01N 21/8507; G01N 2021/4766; G01N 2021/4769; G01N 2021/6417; G01N 2021/6419; G01N 2021/6421; G01N 2021/6491; G01N 2021/6495; G01N 2021/6497; A47L 15/4297
    See application file for complete search history.

(56) References Cited

U.S. PATENT DOCUMENTS

| | | | | |
|---|---|---|---|---|
| 5,400,137 | A * | 3/1995 | Winslow | G01N 21/4738 250/435 |
| 5,506,679 | A * | 4/1996 | Cooper | G01N 21/53 356/338 |
| 7,372,039 | B2 * | 5/2008 | Tokhtuev | G01N 21/33 250/356.1 |
| 7,843,560 | B2 | 11/2010 | Harner et al. | |
| 8,352,207 | B2 * | 1/2013 | Tokhtuev | G01N 21/274 702/104 |
| 9,425,344 | B2 | 8/2016 | Brohan et al. | |
| 9,618,450 | B2 | 4/2017 | Banks et al. | |
| 2002/0133080 | A1 * | 9/2002 | Apruzzese | G01N 21/278 600/477 |
| 2004/0159145 | A1 * | 8/2004 | Seevers | G01N 33/2894 73/61.59 |
| 2004/0171161 | A1 * | 9/2004 | Miller | G01N 31/168 436/42 |
| 2005/0264817 | A1 * | 12/2005 | Havard | G01N 21/532 356/442 |
| 2008/0102525 | A1 * | 5/2008 | Rannikko | G01N 33/721 436/15 |
| 2013/0206971 | A1 | 8/2013 | Kamimura et al. | |
| 2015/0041682 | A1 * | 2/2015 | Cano | G01N 21/274 250/459.1 |
| 2015/0090900 | A1 * | 4/2015 | Banks | G01N 21/645 250/432 R |
| 2016/0139046 | A1 * | 5/2016 | Baltz | G01N 27/07 356/72 |

FOREIGN PATENT DOCUMENTS

| | | | | |
|---|---|---|---|---|
| WO | WO-2009013692 | A2 * | 1/2009 | ........... A61B 5/0091 |
| WO | WO-2009060383 | A2 * | 5/2009 | ........... A61B 5/0091 |

OTHER PUBLICATIONS

Barium Sulfate, Material Safety Data Sheet, Sigma-Aldrich, Version 3.8, Revision Date: Apr. 30, 2013, Print Date: Dec. 2, 2013, 6 pages.

Turbidity 4000 NTU Calibration Standard—Formazin, Material Safety Data Sheet, Sigma-Aldrich, Version 5.3, Revision Date: Nov. 4, 2013, Print Date: Dec. 2, 2013, 7 pages.

"Method 180.1: Determination of Turbidity by Nephelometry," Edited by James W. O'Dell, Environmental Monitoring Systems Laboratory, Office of Research and Development, US Environmental Protection Agency, Revision 2.0, Aug. 1993, 10 pages.

Contado et al., "TiO2 in Commercial Sunscreen Lotion: Flow field-flow fractionation and ICP-AES together for size analysis," Analytical Chemistry, American Chemical Society, US, vol. 80, No. 19, Oct. 1, 2008, pp. 7594-7608.

Lomer et al., "Determination of titanium dioxide in foods using inductively coupled plasma optical emission spectrometry," The Analyst, vol. 125, No. 12, 2000, pp. 2339-2343.

Roessler et al., "Permanent Turbidity Standards," Applied Microbiology, American Society for Microbiology, US, vol. 15, No. 5, Sep. 1967, pp. 1114-1121.

International Patent Application No. PCT/US2018/023496, International Search Report and Written Opinion dated Jun. 27, 2018, 18 pages.

* cited by examiner

TECHNIQUES AND MATERIALS FOR CALIBRATING OPTICAL SENSORS

RELATED MATTERS

This application claims priority to U.S. Provisional Patent Application No. 62/477,287, filed Mar. 27, 2017, the entire contents of which are incorporated herein by reference.

TECHNICAL FIELD

This disclosure relates to optical measuring devices and, more particularly, to techniques and materials for calibrating optical measuring devices.

BACKGROUND

In cleaning and antimicrobial operations, commercial users (e.g., restaurants, hotels, food and beverage plants, grocery stores, etc.) rely upon the concentration of a cleaning or antimicrobial product to make the product work effectively. Failure of a cleaning or antimicrobial product to work effectively (for example due to concentration issues) can cause a commercial user to perceive the product as lower quality. End consumers may also perceive the commercial provider of such products as providing inferior services. In addition, commercial users may be investigated and/or sanctioned by government regulatory and health agencies. Accordingly, operators may utilize monitoring systems to monitor the characteristics of fluid solutions, e.g., to determine if the concentration of a product is within a specified concentration range. The same may be true for other applications, such as food and beverage production, commercial and industrial water treatment, pest control, beverage and bottling operations, oil and gas refining and processing operations, and the like.

One type of system that may be used to evaluate characteristics of a liquid media is an optical sensor system. A liquid sample under analysis can be exposed to predetermined wavelengths of light and the optical response of the liquid measured to determine characteristics of the liquid. For example, the optical sensor may direct light into the liquid sample to cause certain molecules in the sample to emit fluorescent emissions, the magnitude and frequency of which can be measured by the optical sensor. As another example, the optical sensor may direct light into the liquid sample and measure the amount of light scattered and/or transmitted through the sample. The concentration of one or chemical components in the sample can be determined based on the measured optical response of the sample.

In practice, an optical sensor may be calibrated periodically to ensure that the measurements made by the sensor are accurate. To calibrate the sensor, the optical sensor can be exposed to a calibration medium having known optical characteristics. The resulting optical measurements made by the optical sensor can be compared to the known optical characteristics of the calibration medium and recalibration steps taken based on the comparison.

To calibrate optical turbidity sensors, commercially available calibration standards typically utilize formazin as a turbidity agent. Formazin is an organic polymer produced when hydrazine sulfate and hexamethylenetetramine are reacted. Particles of polymeric formazin can be suspended in water to create a turbid solution of known characteristics that can then be used to calibrate the optical sensor. For example, a suspension of 1.25 mg/L hydrazine sulfate and 12.5 mg/L hexamethylenetetramine in water has a turbidity of one Formazin Turbidity Unit (FTU). While formazin-based calibration standards are effective, formazin is not considered safe for human consumption. Accordingly, operators of optical sensors in food and beverage production facilities may be limited in the extent to which they can use a formazin-based calibration standard.

SUMMARY

In general, this disclosure is directed to calibration compositions for optical sensors and techniques for calibrating optical sensors. In some examples, a composition for calibrating an optical sensor according to the disclosure includes an aqueous base and inorganic, water insoluble, food safe light-scattering particles. The composition may also include a viscosity increasing agent to increase the viscosity of the aqueous base as compared to the viscosity of pure water. For example, the viscosity increasing agent may be selected and added to the aqueous base in an amount effective to allow the inorganic light scattering particles to remain suspended in the composition for a period of time sufficient for an optical sensor to be calibrated using the composition. In use, an operator may agitate the composition to substantially uniformly suspend the inorganic light scattering particles in the composition, and the particles may remain substantially suspended for the duration of the calibration procedure.

The components of the calibration composition can all be selected to be food safe components. Food safe components may be those that satisfy the requirements of being Generally Recognized As Safe ("GRAS") under sections 201(s) and 409 of the United States Food, Drug, and Cosmetic Act, and the FDA's implementing regulations in 21 C.F.R. §§ 170.3 and 170.30. By selecting the components of the calibration composition to be food safe, the resulting composition may be deemed safe and acceptable to use in facilities that produce and/or handle foods and beverages suitable for human consumption. As a result, an operator of such a facility or a third-party technician servicing the facility may be able to bring the calibration composition directly into the production area where food and beverage materials are being handled to calibrate an optical sensor in situ and/or on the production floor. This can reduce the amount of time and attendant cost to calibrate the optical sensor as compared to if the optical sensor were required to be removed from the production facility and calibrated using a non-food safe calibration standard outside of the facility.

Some configurations of optical sensors are designed to measure multiple different optical characteristics of a material under analysis. For example, an optical sensor may be configured to measure both fluorometric characteristics of a material under analysis and turbidity characteristics of the material. When so configured, both the fluorometric measurements of the optical sensor and the turbidimetric measurements of the optical sensor may be calibrated using one or more calibration compositions.

In some examples, a calibration composition according to the disclosure is configured as a dual-purpose calibration standard to support calibration of both the turbidity measurements made by an optical sensor and the fluorometric measurements made by the optical sensor. The components of the calibration composition may be specifically selected to be non-auto fluorescing components, e.g., such that the calibration composition does not emit a fluorometric response to light from the optical sensor. During calibration, one or more optical windows of the optical sensor can be partially or fully immersed in the calibration composition. The optical sensor can then be controlled to emit light into the calibration composition and to detect the amount of light reflected from the composition to determine the turbidity of the calibration composition. The turbidity measured using the optical sensor can be compared to the known turbidity of the calibration composition to recalibrate the optical sensor. Additionally, the optical sensor can be controlled to emit light into the calibration composition and to detect the fluorometric response of the calibration composition. Where the calibration composition is formulated to emit substantially no fluorescent emissions, the fluorometric response measured using the optical sensor can be compared to the known zero reference point of the calibration composition to help recalibrate the optical sensor.

In one example, a composition for calibrating an optical sensor is described. The composition includes water in an amount greater than 70 percent by weight of the composition, inorganic, water-insoluble, light-scattering particles, and a viscosity modifier in an amount effective to maintain the inorganic, water-insoluble, light-scattering particles in suspension in the composition. The example specifies that the composition is non-fluorescing when exposed to ultraviolet light.

In another example, method of calibrating a turbidity and fluorometric optical sensor is described. The method includes emitting light at a first wavelength by an optical emitter of an optical sensor into a calibration composition, detecting light scattered by the calibration composition in response to light emitted at the first wavelength by an optical detector of the optical sensor, and determining therefrom a turbidity of the calibration composition. The method further involves comparing the turbidity of the calibration composition determined via the optical sensor to a known turbidity of the calibration composition and storing turbidity calibration data in a memory associated with the optical sensor based on the comparison. The method also involves emitting light at a second wavelength different than the first wavelength by the optical emitter of the optical sensor into the calibration composition and detecting an optical response corresponding to fluorescent emissions emitted by the calibration composition. The method includes comparing the fluorescent emissions of the calibration composition detected via the optical sensor to a known fluorescent emissions level of the calibration composition and storing fluorescence calibration data in a memory associated with the optical sensor based on the comparison.

The details of one or more examples are set forth in the accompanying drawings and the description below. Other features, objects, and advantages will be apparent from the description and drawings, and from the claims.

DETAILED DESCRIPTION

Optical sensors are used in a variety of applications, including monitoring industrial processes. An optical sensor can be implemented as a portable, hand-held device that is used to periodically analyze the optical characteristics of a fluid in an industrial process. Alternatively, an optical sensor can be installed to continuously analyze the optical characteristics of a fluid in an industrial process, e.g., in either an in-line or off-line configuration. In either case, the optical sensor may optically analyze the fluid sample and determine different characteristics of the fluid, such as the concentration of one or more chemical species in the fluid.

As one example, an optical sensor may be used in a food or beverage production facility, such as a dairy processing facility, a beer production facility, or other facility that produces human-consumable or animal-consumable products. The optical sensor may be used to monitor the composition of the consumable products themselves and/or an ingredient of the products during production, e.g., to help ensure that the component being monitored is in specification. Alternatively, the optical sensor may be used to monitor the concentration of one or more chemical species used during cleaning and sanitation operations of the production facility. For example, piping and fluid lines of the production facility that normally carry consumable materials may be periodically cleaned using a clean-in-place technique. Clean-in-place typically involves multiple flushing steps such as a pre-rinse step in which water is flushed through the piping, a subsequent cleaning and/or sanitation step in which a chemical solution (e.g., containing a peracid and/or a peroxide) is flushed through the piping, and a final rinse step in which water may again be flushed through the piping. An optical sensor may be used to monitor and/or control the various steps of the clean-in-place process.

Independent of the application or specific configuration of the optical sensor used, the optical sensor may be periodically calibrated to help ensure that the optical sensor is producing accurate measurements. Calibration may involve exposing the optical sensor to a calibration material having known properties and then comparing the properties of the calibration material determined by the optical sensor to the known properties to recalibrate the optical sensor. Calibration coefficients or other calibration information can be generated based on the comparison and stored (e.g., in a memory on the optical sensor) for use when making subsequent measurements using the optical sensor.

In practice, an optical sensor may have multiple channels to make multiple different optical analyses of the sample under investigation. For example, an optical sensor may have one channel to measure the turbidity of the sample. The optical sensor may emit light into the sample and measure the amount of light reflected by the sample to determine the turbidity level of the sample. The optical sensor may determine the concentration of one or more chemical species present in the sample corresponding to the measured turbidity level. As another example, the optical sensor may have a second channel to measure fluorescent emissions emitted by the sample. The optical sensor may emit light into the sample (e.g., at a wavelength different than the wavelength of light used to measure turbidity) and measure the amount of fluorescent emissions generated by the sample, if any, to determine the concentration of one or more chemical species present in the sample corresponding to those fluorescent emissions. When configured with multiple channels, each channel of the optical sensor may need to be calibrated to ensure that measurements made by each channel are sufficiently accurate.

Embodiments of the present disclosure relates to a calibration material that can be used to calibrate an optical sensor. In some examples, the calibration material may be used to calibrate both turbidity measurements made by the optical sensor and fluorometric measurements made by the same optical sensor. The dual-purpose calibration material may be specifically formulated to have a known turbidity response and a known fluorometric response, each of which can be measured by the optical sensor being calibrated. In addition, in some applications, the composition is formulated of food safe ingredients, allowing the composition to be used in facilities that process human-consumable and/or animal-consumable foods and beverages.

In general, the calibration composition may include an aqueous base that forms a majority weight percentage of the composition and that acts as a carrier solvent for one or more other components of the composition. For example, liquid water (e.g., deionized water) may compose at least 70 weight percent of the total weight of the calibration composition, such as at least 75 weight percent, at least 80 weight percent, or at least 85 weight percent of the composition. In some examples, liquid water is present in the composition in an amount ranging from 75 weight percent to 99 weight percent of the composition, such as from 90 weight percent to 98 weight percent, or from 93 to 97 weight percent of the composition. The weight percentages of the individual components of the composition, including water, can be determined based on the sum total of the weight of all the components present in the composition.

To function as a turbidity calibration standard, the calibration composition may include a chemical species that is light reflective to create turbidity within the aqueous base of the composition. When added to the aqueous base, the light scattering chemical species may scatter light emitted into the calibration composition by the optical sensor, thereby allowing the optical sensor to measure the turbidity of the sample. While a variety of different light-scattering chemical species may be used in the calibration composition, in some examples, the light-scattering chemical species is selected to be particles that are substantially water insoluble. That is, the particles may not substantially solvate or dissolve in water. Selecting the light scattering chemical species to be substantially water insoluble can be useful to prevent the particles from dissolving in the aqueous base and thereby losing their light scattering characteristics.

In some examples, the light scattering chemical species is composed of inorganic, light scattering particles. Example inorganic, light scattering particles that may be used in the calibration composition include particles formed of one or more metal oxides that are inert and do not change oxidation state in water, such as a metal oxide pigment compositions. In applications where the calibration composition is intended to be suitable for use in a food or beverage production facility, the light scattering particles may be a food safe ingredient that is allowed to be brought into the production facility. Example inorganic, light scattering particles that may be food safe include particles formed of (e.g., consisting of, or consisting essentially of) titanium oxide (e.g., titanium dioxide), alumina (aluminum oxide), zinc oxide, magnesium oxide, calcium oxide, silicon dioxide, and combinations thereof. In one specific example, the inorganic, light scattering particles consist essentially of titanium dioxide.

In general, the light scattering particles may have a particle size sufficiently large to scatter light emitted into the calibration composition for turbidity calibration but not so large as to fall out of suspension in the calibration composition. In some examples, the light scattering particles have an average particle size ranging from 0.1 μm to 0.5 μm, such as from 0.2 μm to 0.3 μm. A majority of the light scattering particles may fall within the foregoing size ranges, such as at least 50 volume percent of the light scattering particles may fall within the foregoing size ranges, at least 75 volume percent, or at least 90 volume percent.

Where the calibration composition is intended to calibrate both a turbidity channel and a fluorometric channel of an optical sensor, the light scattering particles may further be selected based on their fluorometric characteristics. Fluorescent emissions are generated when light at one frequency is directed into a molecule and electrons in the molecule excite, causing florescent emissions that emit light at a different frequency than that emitted into the molecule. In some applications, the calibration composition is intended to function as a blank or zero fluorescence emission standard for calibrating the fluorometric channel of the optical sensor. In use, the optical sensor may measure the turbidity of the calibration composition and that measured turbidity can be compared to the known turbidity of the composition to calibrate the optical sensor. Further, the optical sensor may measure the fluorescence of the calibration composition and, since the calibration composition is deemed to have no fluorescence, use the measured fluorescence response as a zero point for calibrating the optical sensor.

In applications where the calibration composition is configured to function as a blank or zero fluorescence emission standard, the light scattering particles may be particles that emit substantially no fluorescent emissions when exposed to ultraviolet light (e.g., light having a wavelength from approximately 10 nm to approximately 380 nm). Molecules that typically exhibit fluorescence include polycyclic compounds and/or benzene molecules that have one or more substituent electron donating groups such as, e.g., —OH, —NH$_2$, and —OCH$_3$. Accordingly, the calibration composition may be substantially or entirely devoid of these types of molecules.

The light scattering particles may be incorporated into the aqueous base in amount effective to provide a desired target turbidity level for the calibration composition. The turbidity of compositions incorporating light scattering particles can be measured following techniques currently used to measure the turbidity of formazin reference standards, such as ASTM 7315 or ASTM 7725, to comply with ISO 7027. Such techniques may use a nephelometer to measure turbidity, with the resulting turbidity measurements being reported in Nephelometric Turbidity Units (NTU). The specific turbidity to which the calibration composition is formulated may vary depending on the expected turbidity levels the optical sensor will be exposed to during normal operation. In some examples, the light scattering particles are added to the aqueous base in an amount effective to cause the calibration composition to have a turbidity ranging from 1 NTU to 10,000 NTU, such as from 10 NTU to 7500 NTU, or from 3000 NTU to 5000 NTU. These turbidity levels may correspond to those typically seen by an optical sensor in a food and/or beverage production facility. The specific amount of light scattering particles needed to be added to the calibration composition to achieve these turbidity levels may vary depending on the chemical species selected as the light scattering particle for the composition. In some examples, such as where the light scattering particle is a metal oxide like titanium dioxide, the light scattering particles may be present in the calibration composition in amount ranging from 0.001 weight percent to 1 weight percent of the calibration composition, such as from 0.05 weight percent to 0.1 weight percent, or from 0.01 weight percent to 0.25 weight percent.

In practice, an optical sensor may be calibrated using multiple calibration compositions having different turbidity levels. Each calibration composition may have the same constituent components but may vary in the amount of light scattering particles incorporated into the composition. For example, the optical sensor may be exposed to two, three, or more different calibration compositions each having a different amount of light scattering particles. In some examples, the amount of light scattering particles present in each of the different calibration compositions to which the optical sensor is exposed varies by at least 10 weight percent from each other calibration composition used, such as at least 20 weight percent.

To help prevent the light scattering particles from collecting at the bottom of the aqueous base under the force of gravity, the calibration composition may include a rheology modifier and/or a viscosity modifier. The rheology modifier can modify the flow characteristics of the calibration composition. Example food-safe rheology modifiers that may be used include alginates, carrageenan, and cellulose derivatives (e.g., microcrystalline cellulose, caroxymethylcellulose sodium, hydroxypropylcellulose, hydroxypropylmethylcellulose, methylcellulose).

The viscosity modifier may function to increase the viscosity of the calibration composition, e.g., as compared to the viscosity of the water alone. This can help keep the light scattering particles substantially uniformly suspended within the calibration composition, at least over the time period during which the calibration is performed. A variety of different viscosity modifiers may be added to the calibration composition to increase the viscosity of the aqueous base. In some examples, the viscosity modifier is an aliphatic alcohol, such as an aliphatic polyol. When appropriately formulated, such components may function to increase the viscosity of the aqueous base while also being food safe and not producing florescent emissions. Example viscosity modifiers that may be used in the calibration composition include non-autofluorescing glycerol (also referred to as glycerin) and non-autofluorescing propylene glycol. The term non-autofluorescing indicates that the component does not naturally emit florescent emissions in response to ultraviolet light. Other viscosity modifiers that may be used include xanthan gum and soy lecithin.

In applications where the calibration composition is configured to function as a blank or zero fluorescence emission standard, the viscosity modifier may also be configured to emit substantially no florescent emissions when exposed to ultraviolet light (e.g., light having a wavelength from approximately 10 nm to approximately 380 nm). For example, viscosity modifier may emit less than 500 ppm Vortexx™ (a mixture of peroxyacetic acid and octanoic acid available from Ecolab Inc.) equivalent units, such as less than 300 ppm Vortexx™ equivalent units, less than 100 ppm Vortexx™ equivalent units, less than 25 ppm Vortexx™ equivalent units, less than 10 ppm Vortexx™ equivalent units, or 0 ppm Vortexx™ equivalent units. As discussed above, molecules that typically exhibit fluorescence include polycyclic compounds and/or benzene molecules that have one or more substituent electron donating groups such as, e.g., —OH, —NH$_2$, and —OCH$_3$. Accordingly, the viscosity modifier selected for use in the calibration composition may be substantially or entirely devoid of these types of molecules.

Without wishing to be bound by any particular theory, in applications where the viscosity modifier is glycerin, it is speculated that the fluorescence in some glycerin sources may be caused by trace amounts of triglycerides left over from the distillation of bio-diesel to produce the glycerin. In some examples, glycerin used in a calibration composition according to the disclosure has less than 1000 ppm of triglycerides, such as less than 500 ppm triglycerides, less than 100 ppm triglycerides, less than 50 ppm triglycerides, or less than 10 ppm triglycerides. For example, the glycerin may be devoid of triglycerides. In some examples where glycerin is used, the glycerin has at least 95% purity relative to U.S. Pharmacopeia (USP) reference 1295607, such as at least 96% purity, at least 98% purity, at least 99% purity, at least 99.5% purity, or 100% purity.

The viscosity modifier may be incorporated into the calibration composition in an amount effective to maintain the light scattering particles in substantially uniform suspension during the calibration procedure. During calibration, a user may agitate the calibration composition, through vigorous shaking or stirring, to cause any settled light scattering particles to substantially uniformly distribute throughout the volume of the calibration composition. The viscosity of the calibration composition may be effective to maintain the light scattering particles in substantially uniform suspension after hand agitation for at least 10 minutes, such as at least 30 minutes, at least one hour, or at least 2 hours.

While the amount of viscosity modifier added to the calibration composition may vary, e.g., depending on the specific chemical species selected as the viscosity modifier, in some examples, the amount of viscosity modifier added to the calibration composition ranges from 1 weight percent to 10 weight percent of the total weight of the calibration composition. For example, the viscosity modifier may be present in the calibration composition in amount ranging from approximately 1.5 weight percent to approximately 7.5 weight percent of the total weight of the calibration composition, such as from 3 weight percent to 6 weight percent.

To help prevent bacterial growth in the calibration composition, the calibration composition may be buffered to an acidic pH level (e.g., pH less than 7.0, such as less than 5.0). Buffering agents may be added to the calibration composition to establish and maintain the acidic pH level and may be in the form of an acid and conjugate salt or a base and conjugate salt. In one example, the buffering agents are a combination of phosphoric acid and phosphate salts, although other chemically compatible (e.g., and non-autofluorescing) buffering agents may be used. For example, the buffering agents may include a mineral acid or an organic acid, such as a citric, ammonium, lactic, acetic, and/or other food-grade organic acid. When added to the calibration composition, the buffering agents may be present in amount ranging from 0.1 weight percent to 1 weight percent based on the total weight of the calibration composition, although other suitable weight percentages can also be used.

When the calibration composition is configured to function as a blank or zero fluorescence emission standard in addition to or in lieu of a turbidity standard, the calibration composition may be non-fluorescing when exposed to UV light (optionally within a wavelength ranging from 200 nm to 300 nm). For example, the calibration composition may exhibit less fluorescent emissions when exposed to UV light than the fluorescent emissions emitted by a blank of deionized water using the same sensor under the same operating conditions. The calibration composition may exhibit a magnitude of fluorescent emissions approximately equal (+/− 20%) to the magnitude of fluorescent emissions emitted by ultrapure water (18 megaohm) water, which is a typical calibration standard for zero fluorescence.

In practice, an optical sensor may be calibrated using multiple calibration compositions having different levels of fluorescent emissions. For example, the optical sensor may be exposed to two, three, or more different calibration compositions each having different levels of increasing fluorescence, one of which is may be a calibration composition having a zero fluorescence level according to the present disclosure. While a calibration composition according to the disclosure can have a variety of different formulations as described herein, an example formulation is as follows:

| Calibration Composition Ingredient | Example Ranges |
|---|---|
| Water | At least 70 weight percent of the total weight of the calibration composition, such as at least 75 weight percent, at least 80 weight percent, or at least 85 weight percent of the composition. For example, water may be present the composition in an amount ranging from 75 weight percent to 99 weight percent of the composition, such as from 90 weight percent to 98 weight percent, or from 93 to 97 weight percent of the composition. |
| Light Scattering Particles (e.g., titanium dioxide) | From 0.001 weight percent to 1 weight percent of the calibration composition, such as from 0.05 weight percent to 0.1 weight percent, or from 0.01 weight percent to 0.25 weight percent. |
| Viscosity Modifier (e.g., Glycerin) | From 1 weight percent to 10 weight percent of the calibration composition, such as from approximately 1.5 weight percent to approximately 7.5 weight percent, or from 3 weigh percent to 6 weight percent. |
| Buffering Agent | From 0.1 weight percent to 15 weight percent of the calibration composition, such as from 1 weight percent to 10 weight percent, or from 0.1 weight percent to 1 weight percent. |

A calibration composition formulated as outlined in the foregoing table can exhibit the following properties:

| Property of Calibration Composition | Example Ranges |
|---|---|
| Fluorescence | Calibration composition emits less than 500 ppm Vortexx ™ equivalent units of fluorescence, such as less than 300 ppm Vortexx ™ equivalent units, less than 100 ppm Vortexx ™ equivalent units, less than 25 ppm Vortexx ™ equivalent units, less than 10 ppm Vortexx ™ equivalent units, or 0 ppm Vortexx ™ equivalent units. |
| Triglycerides | Calibration composition has less than 1000 ppm of triglycerides, such as less than 500 ppm triglycerides, less than 100 ppm triglycerides, less than 50 ppm triglycerides, or less than 10 ppm triglycerides. |
| Light Scattering Particle Stability | Light scattering particles remain in a substantially uniform suspension in the calibration composition after agitation for at least 10 minutes, such as at least 30 minutes, at least one hour, or at least 2 hours. |
| Turbidity | Calibration composition exhibits a turbidity ranging from 1 NTU to 10,000 NTU, such as from 10 NTU to 7500 NTU, or from 3000 NTU to 5000 NTU. |

Figure 1:
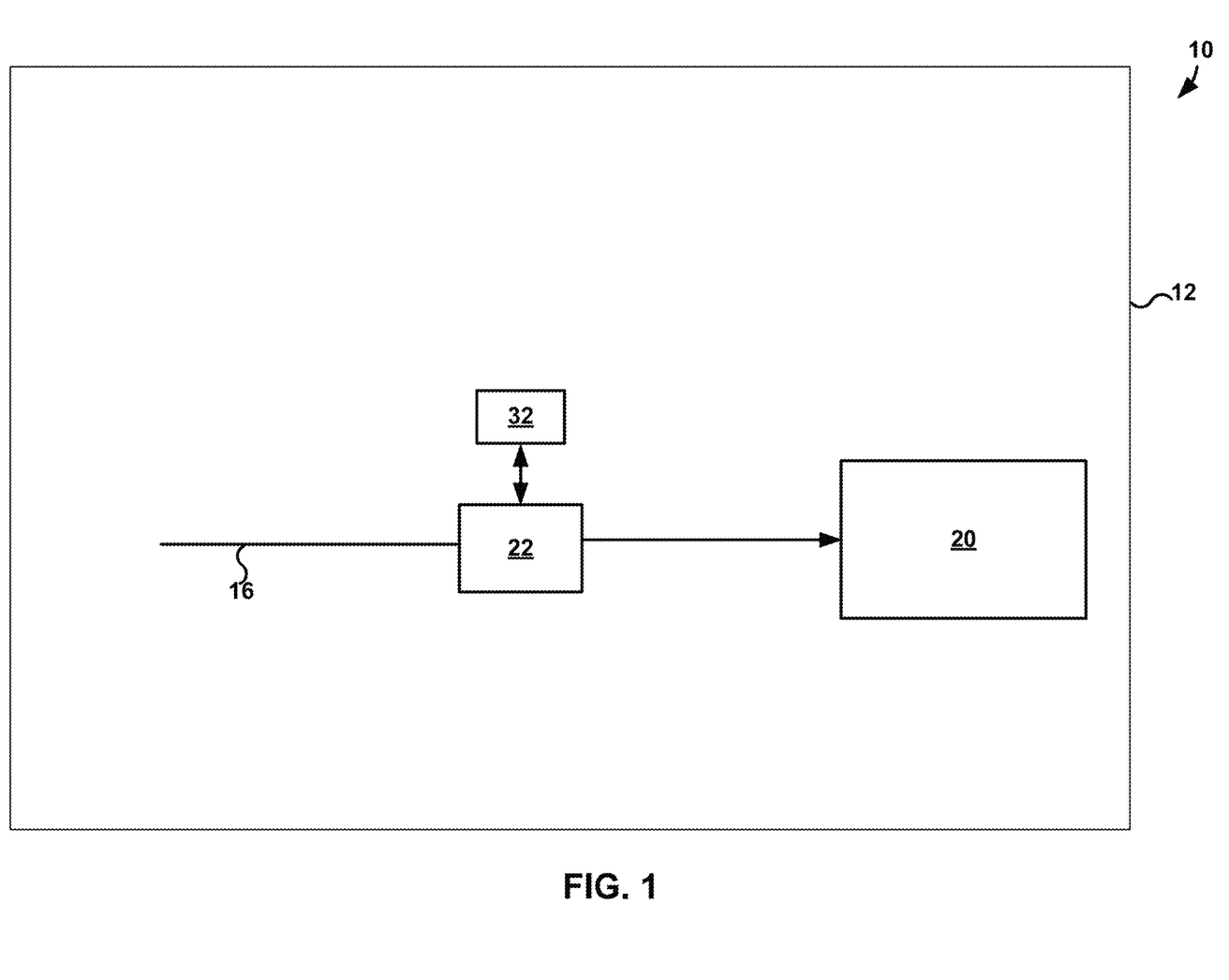
FIG. 1 is a block diagram illustrating an example optical sensor system that can be calibrated with a calibration composition according to the disclosure.

A calibration composition according to the disclosure can be used to calibrate a variety of different optical sensors used in a variety of different process environments. FIG. 1 is a block diagram illustrating one example optical sensor system 10 that can be calibrated with a calibration composition according to the disclosure. System 10 illustrates an example operating environment 12 in which an optical sensor 22 measures the optical response of liquid within the operating environment. Operating environment 12 may be a manufacturing facility that processes mammalian-consumable foods or beverages, or ingredients thereof. Alternatively, operating environment 12 may be any other location where the contents of liquid being processed are desirably analyzed to determine the optical characteristics thereof. Optical sensor 22 may be physically attached to and in fluid communication with cleaning equipment used in operating environment 12, such as a clean-in-place system used to clean piping in operating environment 12. Alternatively, optical sensor 22 may be physically separate from piping in operating environment 12 but may have a reservoir in which fluid from operating environment 12 can be added for measurement.

In the example of FIG. 1, optical sensor 22 is illustrated as being implemented to optically analyze fluid passing through a fluid conduit 16 toward a fluid reservoir 20 in operating environment 12. As discussed in greater detail with respect to FIG. 2, optical sensor 22 may receive a sample of the fluid flowing through fluid conduit 16, direct light into the fluid to generate fluorescent emissions from product liquid (if any) in the fluid, and detect the fluorescent emissions emitted by the fluid. The fluorescent emissions may be proportional to the concentration of one or more chemical species in the liquid (e.g., cleaning and/or sanitizing agents). Additional or alternatively, optical sensor 22 may receive a sample of the fluid flowing through fluid conduit 16, direct light into the fluid, and detect the amount of light scatted by the fluid. The amount of scattered light detected by the optical sensor, which may be reported as the turbidity of the liquid, may be proportional to the concentration one or more other chemical species in the liquid (e.g., the concentration of the material processed through fluid conduit 16 during normal operation).

Optical sensor 22 may be implemented in a number of different ways in system 10. In the example shown in FIG. 1, optical sensor 22 is positioned in-line with fluid conduit 16 upstream of fluid reservoir 20. When so positioned, optical sensor 22 can determine the concentration of the fluid flowing through fluid conduit 16, e.g., shortly before the fluid discharges into fluid reservoir 20. In other examples, a sample line may be connected to a main conduit connected to fluid reservoir 20. In such examples, the sample line can fluidly connect optical sensor 22 to the main fluid conduit. As fluid moves through the main fluid conduit, a portion of the fluid may enter the sample line and pass adjacent an optical sensor head of the sensor, thereby allowing optical sensor 22 to determine an optical response of the fluid flowing through the main fluid conduit. When implemented to receive fluid continuously, optical sensor 22 may be characterized as an online optical sensor. In other examples, optical sensor 22 may be implemented as an offline optical sensor that receives fluid on an intermittent basis, e.g., by manually filling the optical sensor with fluid.

In one example, optical sensor 22 receives fluid flowing through fluid conduit 16 as the fluid is passing through the conduit toward fluid reservoir 20. Optical sensor 22 optically analyzes the fluid by directing light into the fluid. Optical sensor 22 detects light scattered from the fluid and/or fluorescent emissions generated by the fluid and generates therefrom an optical sensor output proportional to the amount and/or wavelength of the light detected. Controller 32 can receive the optical sensor output and determine a concentration of one or more chemical species in the fluid based on the output.

Fluid conduit 16 in FIG. 1 is illustrated as being connected to fluid reservoir 20. Fluid reservoir 20 may be any type of container designed to receive and hold liquid, such as a fixed tank, a mobile tanker truck, a bottle, a tote. In some examples, fluid reservoir 20 is configured to both receive liquid and further process the liquid. For example, fluid reservoir 20 may be part of a filling station (e.g., bottle filler) having one or more filling heads. As another example, fluid reservoir 20 may a reactor vessel, distillation column, or other piece of processing equipment designed to both receive and process product liquid. In these examples, fluid reservoir 20 may receive and hold product liquid for a comparatively short period of time as the product liquid is being further processed.

To calibrate optical sensor 20, a calibration composition according to the disclosure may be brought into operating environment 12 (e.g., a building or physical facility housing the optical sensor during normal operation). Alternatively, optical sensor 20 may be removed from operating environment 12 and recalibrated outside of the operating environment. In either case, the sensor head of the optical sensor containing one or more optical windows may be immersed in the calibration composition. Depending on the arrangement of optical sensor 20, the optical sensor may be removed from fluid conduit 16 and the head of the sensor immersed in the calibration composition. Alternatively the calibration composition may be introduced into fluid conduit 16 and the optical sensor calibrated in situ without removing the sensor from the fluid conduit.

In either case, the optical sensor 20 may be controlled to emit light into the calibration composition and detect light from the calibration composition in response the emitted light. Optical sensor 20 may emit light at one wavelength (e.g., within the visible spectrum) and detect light at that same wavelength scattered from the calibration composition. Optical sensor 20 may determine a turbidity of the calibration composition based on the scattered light detected from the calibration composition. This turbidity determined by optical sensor 20 can be compared to a known turbidity of the calibration composition, which may be measured using a nephelometer. Calibration information for turbidity measurements made by the optical sensor can be determined based on the comparison and stored in a memory associated with the optical sensor for use when making subsequent turbidity measurements.

As another example, the optical sensor 20 may be controlled to emit light into the calibration composition and to detect any light corresponding to fluorescent emissions by the optical sensor. Optical sensor 20 may emit light at one wavelength (e.g., within the UV spectrum) and detect light at a different wavelength corresponding to fluorescent emissions from the calibration composition. Optical sensor 20 may determine a level of fluorescent emissions in the calibration composition based on the light detected from the calibration composition. In applications where the calibration composition is a blank or is deemed to have zero fluorescent emission, the fluorescent emissions detected by optical sensor 20 from the calibration composition may be attributable to a calibration error of the sensor. Accordingly, calibration information for fluorescent emissions detected by the optical sensor can be determined based on the level of fluorescent emissions detected from the blank or zero fluorescent emission level calibration composition and stored in a memory associated with the optical sensor for use when making subsequent fluorescent emission measurements.

Although FIG. 1 illustrates one particular arrangement of a system in which fluid is optically analyzed, it should be understood that the hardware, compositions, and techniques of the disclosure may be beneficially implemented in systems beyond that of FIG. 1. Accordingly, the disclosure is not limited to the example arrangement of components illustrated in FIG. 1.

Figure 2:
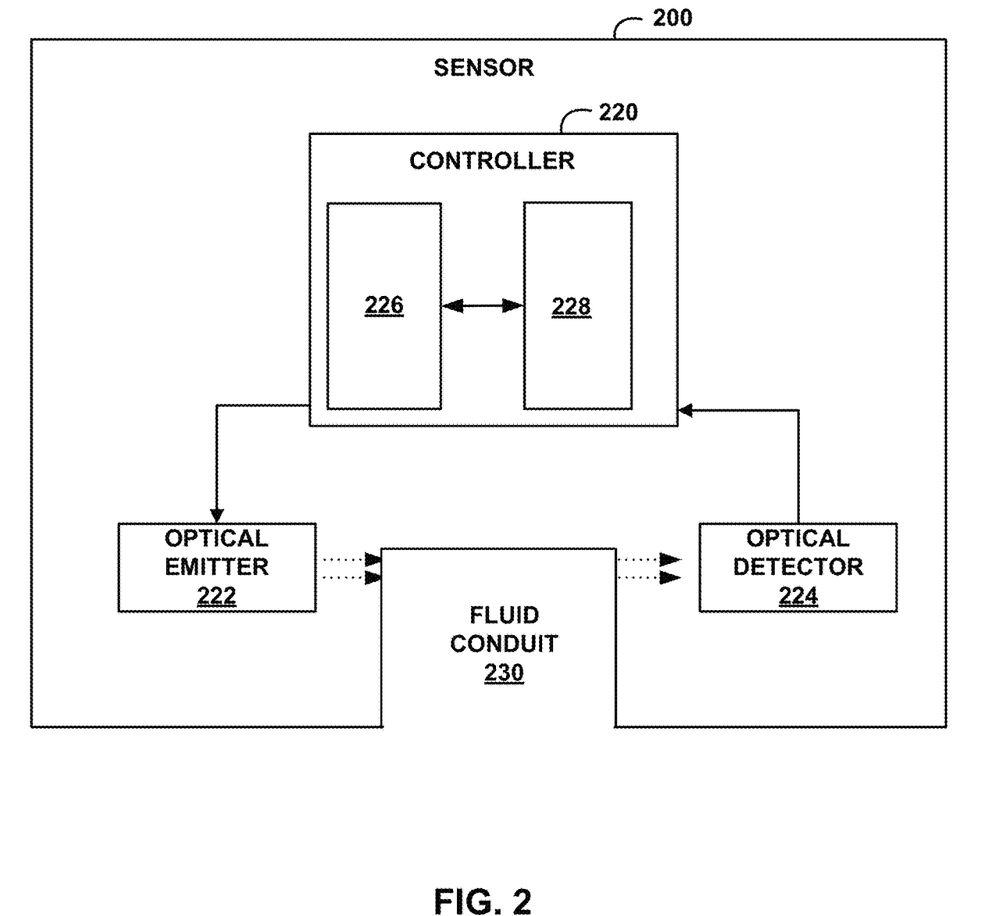
FIG. 2 is a block diagram illustrating an example configuration of an optical sensor that can be calibrated using a calibration composition according to the disclosure.

FIG. 2 is a block diagram illustrating an example of an optical sensor 200 that may be used to optically analyze a fluid from system 10. Sensor 200 may be used as optical sensor 22 in system 10. With reference to FIG. 2, sensor 200 includes a controller 220, one or more optical emitters 222 (referred to herein as "optical emitter 222"), and one or more optical detectors 224 (referred to herein as "optical detector 224"). Controller 220 (which may be the same as controller 32 in FIG. 1) includes a processor 226 and a memory 228. In operation, optical emitter 222 directs light into fluid (e.g., liquid being processed through fluid conduit 16 during normal operation of system 10, liquid containing cleaning and/or sanitizing agents that is used to clean fluid conduit 16) and optical detector 224 detects an optical response of the fluid.

In one example, optical sensor 200 may measure the turbidity of the fluid under analysis. Light directed into the fluid by optical emitter 222 may be scattered by light-scattering components in the fluid. Optical detector 224 can receive and detect the scattered light to determine a turbidity of the fluid being analyzed. Optical sensor 200 may determine a concentration of one or more chemical components in the fluid under analysis based on the measured turbidity of the sample and calibration information stored in memory.

Additionally or alternatively, optical sensor 200 may measure the fluorescence of the fluid sample under analysis. The light directed into the fluid by optical emitter 222 may generate fluorescent emissions by exciting electrons of fluorescing molecules within the fluid, causing the molecules to emit energy (i.e., fluoresce) that can be detected by optical detector 224. For example, when light is directed into a fluid flowing through fluid conduit 16 (FIG. 1), electrons in molecules of product liquid within the fluid may excite, causing the molecules to fluoresce. In some examples, optical emitter 222 directs light at one frequency (e.g., ultraviolet frequency) into fluid flowing through fluid conduit 230 and causes fluorescing molecules to emit light energy at a different frequency (e.g., visible light frequency, a different ultraviolet frequency).

Memory 228 stores software and data used or generated by controller 220. For example, memory 228 may store data used by controller 220 to determine a concentration of one or more products within the fluid being monitored by sensor 200, such as a concentration of a product liquid or component thereof within a fluid being monitored by the sensor. In some examples, memory 228 stores data in the form of an equation or table that relates scattered light (turbidity) detected by optical detector 224 to a concentration of the one or more chemical components. Additionally or alternatively, memory 228 may store data in the form of an equation or table that relates fluorescent emissions detected by optical detector 224 to a concentration of the one or more chemical components.

Processor 226 runs software stored in memory 228 to perform functions attributed to sensor 200 and controller 220 in this disclosure. Components described as processors within controller 220, controller 30, or any other device described in this disclosure may each include one or more processors, such as one or more microprocessors, digital signal processors (DSPs), application specific integrated circuits (ASICs), field programmable gate arrays (FPGAs), programmable logic circuitry, or the like, either alone or in any suitable combination.

Optical emitter 222 includes at least one optical emitter that emits optical energy into a fluid present with fluid conduit 230. In some examples, optical emitter 222 emits optical energy over a range of wavelengths. In other examples, optical emitter 222 emits optical energy at one or more discrete wavelengths. For example, optical emitter 222 may emit at two, three, four or more discrete wavelengths.

In one example, optical emitter 222 emits light within the visible spectrum. Light within the visible spectrum may include wavelengths in the range from approximately 400 nm to approximately 700 nanometers. Light emitted by optical emitter 222 is directed into fluid within fluid conduit 230. Light scattered by the fluid sample and at the same wavelength as that emitted into the fluid sample by optical emitter 222 can be detected by optical detector 224. Optical sensor 200 may determine the turbidity of the fluid based on the amount of scattered light detected by optical detector 224.

As another example, optical emitter 222 may emits light within the ultraviolet (UV) spectrum. Light within the UV spectrum may include wavelengths in the range from approximately 10 nm to approximately 400 nanometers. Light emitted by optical emitter 222 is directed into fluid within fluid conduit 230. In response to receiving the optical energy, fluorescing molecules (if any) within the fluid may excite, causing the molecules to produce fluorescent emissions. The fluorescent emissions, which may or may not be at a different frequency than the energy emitted by optical emitter 222, may be generated as excited electrons within fluorescing molecules change energy states. The energy emitted by the fluorescing molecules may be detected by optical detector 224.

The specific wavelengths at which optical emitter 222 emits light may vary, e.g., depending on the type of light scattering molecules and type of fluorescing molecules expected to be present in fluid under analysis. In some examples, optical emitter 222 emits light at a frequency of less than 350 nanometers (nm), such as less than 330 nm, or less than 300 nm to detect fluorescent emissions. For example, optical emitter 222 may emit light in the frequency range of approximately 275 nm to approximately 335. The foregoing wavelengths are merely examples, however, and other wavelengths of light may be used.

Optical emitter 222 may be implemented in a variety of different ways within sensor 200. Optical emitter 222 may include one or more light sources to scatter light and/or excite molecules within the fluid. Example light sources include light emitting diodes (LEDS), lasers, and lamps. In some examples, optical emitter 222 includes an optical filter to filter light emitted by the light source. The optical filter may be positioned between the light source and the fluid and be selected to pass light within a certain wavelength range. In some additional examples, the optical emitter includes a collimator, e.g., a collimating lens, hood or reflector, positioned adjacent the light source to collimate the light emitted from the light source. The collimator may reduce the divergence of the light emitted from the light source, reducing optical noise.

Sensor 200 also includes optical detector 224. Optical detector 224 includes at least one optical detector that detects scattered light and/or fluorescent emissions emitted by excited molecules within fluid conduit 230. In some examples, optical detector 224 is positioned on a different side of fluid conduit 230 than optical emitter 222. For example, optical detector 224 may be positioned on a side of fluid conduit 230 that is offset approximately 90 degrees relative to optical emitter 222. Such an arrangement may reduce the amount of light that is emitted by optical emitter 222, transmitted through fluid within fluid conduit 230, and detected by optical detector 224. This transmitted light can potentially cause interference with fluorescent emissions detected by the optical detector.

In operation, the amount of optical energy detected by optical detector 224 may depend on the contents of the fluid within fluid conduit 230. If the fluid conduit contains a fluid solution that has certain properties (e.g., a certain concentration of chemical components), optical detector 224 may detect a certain level of scattered light and/or fluorescent emissions emitted by the fluid. However, if the fluid solution has different properties (e.g., a different concentration of chemical components), optical detector 224 may detect a different level of reflected light and/or fluorescent emissions emitted by the fluid. For example, if fluid conduit 230 is filled with a liquid diluted to a first concentration, optical detector 224 may detect a first magnitude of scattered light and/or fluorescent emissions. However, if the fluid conduit is filled with a liquid diluted to a second concentration greater than the first concentration (e.g., such that the product liquid is more dilute), optical detector 224 may detect a second magnitude of scattered light and/or fluorescent emissions that is greater than the first magnitude.

Optical detector 224 may also be implemented in a variety of different ways within sensor 200. Optical detector 224 may include one or more photodetectors such as, e.g., photodiodes or photomultipliers, for converting optical signals into electrical signals. In some examples, optical detector 224 includes a lens positioned between the fluid and the photodetector for focusing and/or shaping optical energy received from the fluid.

It should be appreciated that although FIG. 2 illustrates one particular configuration of an optical sensor, other optical sensor configurations can be used without departing from the scope of the disclosure. For example, instead of positioning optical emitter 222 on a different side of fluid conduit 230 from optical detector 224, optical emitter 222 and optical detector 224 may be positioned to direct and receive light through a single, shared lens (e.g., ball lens) positioned on a face of the housing of sensor 200. When so configured, optical emitter 222 may direct light through the lens into a fluid flowing past the lens, causing the fluid to scatter light and/or emit fluorescent emissions. This scattered light and/or these fluorescent emissions may be directed back through the lens to be detected by optical detector 224. Such an example optical sensor is described in U.S. Patent Publication No. 2015/0090900, entitled "MULTI-CHANNEL FLUOROMETRIC SENSOR AND METHOD OF USING SAME," which is commonly assigned with the present Applicant and the entire contents of which are incorporated herein by reference. When so configured, the optical sensor may include a housing that contains various electronic components of the sensor and also has optical pathways to control light movement to and from the single optical lens. Such an arrangement may facilitate design of a compact optical sensor that can be readily installed through a variety of mechanical pipe and process fittings to optically analyze a desired process fluid.

Controller 220 controls the operation of optical emitter 222 and receives signals concerning the amount of light detected by optical detector 224. In some examples, controller 220 further processes signals, e.g., to determine a concentration of one or more chemical species within the fluid passing through fluid conduit 230.

In one example, controller 220 controls optical emitter 222 to direct radiation into a fluid and further controls optical detector 224 to detect scattered light and/or fluorescent emissions emitted by molecules within the fluid. Controller 220 then processes the light detection information to determine a concentration of one or more chemical species within the fluid. Controller 220 can determine a concentration of the chemical species by comparing the magnitude of scattered light and/or fluorescent emissions detected by optical detector 224 from a fluid having an unknown concentration to the magnitude of the scattered light and/or fluorescent emissions detected by optical detector 224 from a fluid having a known concentration of the product liquid. These known concentration values can be determined using a calibration composition in accordance with the disclosure.

The techniques described in this disclosure, including functions performed by a controller, control unit, or control system, may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors or controllers.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices.

If implemented in part by software, the techniques may be realized at least in part by a computer-readable data storage medium (e.g., a non-transitory computer-readable storage medium) comprising code with instructions that, when executed by one or more processors or controllers, performs one or more of the methods and functions described in this disclosure. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

The following example may provide additional details about systems and techniques in accordance with this disclosure.

EXAMPLE 1

A variety of water-based calibration compositions were created and optically analyzed to evaluate how different sources of calibration composition ingredients impacted the optical characteristics of the composition. Four calibration compositions were created using two different sources of titanium dioxide as the light-scattering particles and two different sources of glycerin as the viscosity modifying agent. The samples had the following properties:

Composition # 1: Glycerin Source # 1 and Titanium Dioxide Source # 1

| Raw Material | Target Weight Percent | Actual Weight Percent |
| --- | --- | --- |
| Glycerin 96% USP - Source #1 | 5.0 | 5.00 |
| Aqueous Phosphate Buffer (pH 2.5) | 86.98 | 86.98 |
| Anhydrous Sodium Chloride | 8.00 | 8.00 |
| Titanium Dioxide - Source #1 | 0.020 | 0.0210 |

Composition # 2: Glycerin Source # 1 and Titanium Dioxide Source # 2

| Raw Material | Target Weight Percent | Actual Weight Percent |
| --- | --- | --- |
| Glycerin 96% USP- Source #1 | 5.0 | 5.00 |
| Aqueous Phosphate Buffer (pH 2.5) | 86.98 | 86.96 |
| Anhydrous Sodium Chloride | 8.00 | 8.00 |
| Titanium Dioxide- Source #2 | 0.020 | 0.0265 |

Composition # 3: Glycerin Source # 2 and Titanium Dioxide Source # 1

| Raw Material | Target Weight Percent | Actual Weight Percent |
| --- | --- | --- |
| Glycerin 96% USP- Source #2 | 5.0 | 5.00 |
| Aqueous Phosphate Buffer (pH 2.5) | 86.98 | 86.97 |
| Anhydrous Sodium Chloride | 8.00 | 8.00 |
| Titanium Dioxide- Source #1 | 0.020 | 0.0228 |

| Composition # 4: Glycerin Source # 2 and Titanium Dioxide Source # 2 | | |
|---|---|---|
| Raw Material | Target Weight Percent | Actual Weight Percent |
| Glycerin 96% USP-Source #2 | 5.0 | 5.00 |
| Aqueous Phosphate Buffer (pH 2.5) | 86.98 | 86.7 |
| Anhydrous Sodium Chloride | 8.00 | 8.00 |
| Titanium Dioxide-Source #2 | 0.020 | 0.0193 |

After preparing the above samples, the samples were shaken well to uniformly suspend the titanium dioxide particles in the solutions. The samples were then evaluated for fluorescence and turbidity. Fluorescence was measured using a probe fluorometer. Turbidity was measured using a Hatch 2100N Turbidity meter. The results from each sample are as follows:

| Composition # | Fluorescence (ppm Vortexx™ equivalent units) | Turbidity (NTU) |
|---|---|---|
| 1 | 636 | 4072 |
| 2 | 487 | 2114 |
| 3 | 724 | 3810 |
| 4 | 872 | 1688 |

| Composition # | Glycerin Concentration % | Titanium Dioxide % | ppm Vortexx™ equivalent units per Glycerin % | Turbidity (NTU) per titanium dioxide ppm |
|---|---|---|---|---|
| 1 | 5.00 | 228.31 | 127.12 | 17.84 |
| 2 | 5.00 | 288.17 | 97.44 | 7.34 |
| 3 | 5.00 | 247.88 | 144.45 | 15.37 |
| 4 | 5.00 | 209.78 | 174.36 | 8.04 |

The data showed that titanium dioxide source impacted turbidity levels, even at the same concentration levels, and the source of glycerin used affected the fluorescence response of the samples, even at the same concentration levels.

EXAMPLE 2

To further understand the impact that the source of glycerin has on the fluorescence of the calibration composition, four different sources of ultra-high purity glycerin were evaluated that were each marked as having a purity grade over 99%. To test fluorescence of each glycerin, solutions of 5 wt % glycerin in an aqueous 20 mM phosphate buffer solution at a pH of 2.5 were created. Each sample was then analyzed for fluorescence using the probe fluorometer utilized in Example 1. The sources and results of the testing are as follows:

| Glycerin Source | Fluorescence Level |
|---|---|
| Sample 1 (Source 1 - lot 1) | High (>600 ppm Vortexx™ equivalent units) |
| Sample 2 (Source 1 - lot 2) | High (>600 ppm Vortexx™ equivalent units) |
| Sample 3 (Huntington - lot #SISD281939A) | Lower (approximately 300 ppm Vortexx™ equivalent units) |
| Sample 4 (Brenntag - lot #P01140301) | 0 |

The data surprisingly indicated that certain glycerin sources within the category of ultra-high purity glycerin exhibited no fluorescence, which for purposes of the experiment was considered to be substantially the same fluorescence of the aqueous phosphate buffer solution devoid of glycerin, while most sources exhibited meaningful fluorescence. This indicated that it is possible to create a calibration composition that had controlled turbidity levels but zero fluorescence, thereby allowing the calibration composition to be used as a fluorescence zero or blank. Without wishing to be bound by any particular theory, it is speculated that the fluorescence in the different glycerin sources may be caused by trace amounts of triglycerides left over from the distillation of bio-diesel to produce the glycerin. This suggests that using synthetic glycerin or other pure sources of glycerin substantially or entirely devoid of triglycerides may be effect to form a non-autofluorescing calibration composition.

The invention claimed is:

1. A method of calibrating a turbidity and fluorometric optical sensor comprising:
   selecting a calibration composition formulated of food safe ingredients;
   emitting light at a first wavelength by an optical emitter of an optical sensor into the calibration composition;
   detecting light scattered by the calibration composition in response to light emitted at the first wavelength by an optical detector of the optical sensor and determining therefrom a turbidity of the calibration composition;
   comparing the turbidity of the calibration composition determined via the optical sensor to a known turbidity of the calibration composition and storing turbidity calibration data in a memory associated with the optical sensor based on the comparison;
   emitting light at a second wavelength different than the first wavelength by the optical emitter of the optical sensor into the calibration composition;
   detecting an optical response corresponding to fluorescent emissions emitted by the calibration composition; and
   comparing the fluorescent emissions of the calibration composition detected via the optical sensor to a known fluorescent emissions level of the calibration composition and storing fluorescence calibration data in a memory associated with the optical sensor based on the comparison.

2. The method of claim 1, wherein the known fluorescent emissions level of the calibration composition is a zero fluorescent emissions level.

3. The method of claim 1, wherein the optical sensor houses the optical emitter and the optical detector and contains only a single optical window through which the optical emitter emits light into the calibration composition and through which the optical detector receives light from the calibration composition.

4. The method of claim 1, wherein emitting light at the first wavelength by the optical emitter of the optical sensor into the calibration composition, detecting light scattered by the calibration composition, emitting light at the second wavelength different than the first wavelength by the optical emitter of the optical sensor into the calibration composition, and detecting the optical response corresponding to fluorescent emissions emitted by the calibration composition are each performed in a production area where at least one of a food and a beverage material is being handled.

5. The method of claim 1, further comprising obtaining the optical sensor from a food or beverage production facility where the optical sensor is utilized during normal operation.

6. The method of claim 1, wherein the first wavelength of light is within a range from 400 nanometers to 700 nanometers, and the second wavelength of light is within a range from 200 nanometers to 400 nanometers.

7. The method of claim 6, wherein the optical emitter comprises a first optical emitter housed within the optical sensor that emit light at the first wavelength and a second optical emitter housed within the optical sensor that emits light at the second wavelength.

8. The method of claim 1, wherein the calibration composition comprises:
water in an amount greater than 70 percent by weight of the calibration composition;
inorganic, water-insoluble, light-scattering particles; and
a viscosity modifier in an amount effective to maintain the inorganic, water-insoluble, light-scattering particles in suspension in the calibration composition, and the calibration composition is non-fluorescing when exposed to light emitted at the second wavelength.

9. The method of claim 8, wherein:
the amount of water ranges from 90 percent by weight to 98 percent by weight of the calibration composition;
the inorganic, water-insoluble, light-scattering particles consist essentially of titanium dioxide, and
the inorganic, water-insoluble, light-scattering particles are present in the calibration composition in an amount effective to provide a turbidity ranging from 1 NTU to 10,000 NTU.

10. The method of claim 8, further comprising, prior to emitting light into the calibration composition, agitating the calibration composition to distribute the inorganic, water-insoluble, light-scattering particles substantially uniformly in the calibration composition.

11. The method of claim 8, wherein the calibration composition further comprises a buffering agent that buffers the calibration composition to an acidic pH level.

12. The method of claim 11, wherein the acidic pH level is a pH less than 5.0.

13. The method of claim 11, wherein the buffering agent comprises phosphoric acid and a phosphate salt.

\* \* \* \* \*